US010295337B2

(12) United States Patent
Matsumiya et al.

(10) Patent No.: US 10,295,337 B2
(45) **Date of Patent: *May 21, 2019**

(54) SURFACE TEXTURE MEASURING APPARATUS

(71) Applicant: MITUTOYO CORPORATION, Kanagawa (JP)

(72) Inventors: Sadayuki Matsumiya, Kanagawa (JP); Shuichi Kamiyama, Kanagawa (JP); Hidemitsu Asano, Kanagawa (JP); Hiroshi Sakai, Kanagawa (JP); Hiromu Maie, Kanagwa (JP); Yoshihiko Takahashi, Kanagawa (JP); Masanori Arai, Kanagawa (JP); Ken Motohashi, Eindhoven (NL)

(73) Assignee: MITUTOYO CORPORATION, Kanagawa (JP)

( * ) Notice: Subject to any disclaimer, the term of this patent is extended or adjusted under 35 U.S.C. 154(b) by 148 days.

This patent is subject to a terminal disclaimer.

(21) Appl. No.: 15/433,234

(22) Filed: Feb. 15, 2017

(65) Prior Publication Data

US 2017/0248415 A1 Aug. 31, 2017

(30) Foreign Application Priority Data

Feb. 25, 2016 (JP) ................................ 2016-034436

(51) Int. Cl.
*G01B 5/00* (2006.01)
*G01B 5/06* (2006.01)
(Continued)

(52) U.S. Cl.
CPC .............. *G01B 11/30* (2013.01); *G01B 5/003* (2013.01); *G01B 5/061* (2013.01); *G01B 5/12* (2013.01);
(Continued)

(58) Field of Classification Search
CPC ........ G01B 5/12; G01B 15/04; G01B 15/042; G01B 11/08; G01B 11/12; G01B 11/14;
(Continued)

(56) References Cited

U.S. PATENT DOCUMENTS

2006/0043275 A1* 3/2006 Weber .................... G01B 11/00 250/234
2011/0083497 A1* 4/2011 Matsumiya ............ G01B 5/008 73/105
(Continued)

FOREIGN PATENT DOCUMENTS

JP 2006-64512 3/2006

*Primary Examiner* — Gordon J Stock, Jr.
(74) *Attorney, Agent, or Firm* — Greenblum & Bernstein, P.L.C.

(57) ABSTRACT

A surface texture measuring apparatus includes an X axis displacement mechanism and a Y axis displacement mechanism displacing a measurable object having an interior wall along an XY plane; a measurement sensor measuring a surface texture of the interior wall without contact; a Z axis displacement mechanism displacing the measurement sensor in a Z axis direction orthogonal to the XY plane and bringing the measurement sensor to face the interior wall; a W axis displacement mechanism displacing the measurement sensor facing the interior wall in a normal direction of the interior wall; and a θ axis displacement mechanism displacing the measurement sensor facing the interior wall along the interior wall.

11 Claims, 10 Drawing Sheets

1

(51) Int. Cl.

*G01B 5/12* (2006.01)
*G01B 11/06* (2006.01)
*G01B 11/12* (2006.01)
*G01B 11/24* (2006.01)
*G01B 11/30* (2006.01)

(52) U.S. Cl.

CPC .......... *G01B 11/0608* (2013.01); *G01B 11/12* (2013.01); *G01B 11/2441* (2013.01); *G01B 11/303* (2013.01)

(58) Field of Classification Search

CPC ..... G01B 11/22; G01B 11/24; G01B 11/2408; G01B 11/2416; G01B 11/2425; G01B 11/2433; G01B 11/2441; G01B 11/245; G01B 11/25; G01B 11/2518; G01B 11/30; G01B 11/303; G01B 11/306; G01N 21/9515; G01N 21/952; G01N 21/954; G01N 2021/9516; G01N 2021/9518; G01N 2021/9542; G01N 2021/9544; G01N 2021/9546; G01N 2021/9548

See application file for complete search history.

(56) References Cited

U.S. PATENT DOCUMENTS

2015/0285619 A1* 10/2015 Motohashi ........... G01B 9/0203
356/503
2017/0248416 A1* 8/2017 Sakai ................. G01B 11/2441

* cited by examiner

SURFACE TEXTURE MEASURING APPARATUS

CROSS-REFERENCE TO RELATED APPLICATIONS

The present application claims priority under 35 U.S.C. § 119 of Japanese Application No. 2016-034436, filed on Feb. 25, 2016, the disclosure of which is expressly incorporated by reference herein in its entirety.

BACKGROUND OF THE INVENTION

1. Field of the Invention

The present invention relates to a surface texture measuring apparatus measuring a surface texture of an interior wall of a measurable object using a non-contact-type measurement sensor.

2. Description of Related Art

Conventionally, a surface texture measuring apparatus measuring a surface texture of a measurable object has been used. For example, a surface texture measuring apparatus disclosed in Japanese Patent Laid-open Publication No. 2006-064512 detects a change in position of unevenness on a surface of a measurable object to measure an internal diameter and an external diameter of the measurable object.

In recent years, there has been a demand for automatic measurement of a detailed surface texture of an interior wall of a measurable object. For example, in developing an automobile engine, accurate inspection of an interior wall of a cylinder of the engine, for example, is required from a standpoint of improving engine performance and engine life. Therefore, more accurate observation and measurement of a status of the surface of the interior wall of the cylinder is sought.

SUMMARY OF THE INVENTION

In view of these circumstances, the present invention provides a surface texture measuring apparatus capable of measuring a detailed surface texture of an interior wall of a measurable object with a high degree of accuracy.

In one aspect of the present invention, a surface texture measuring apparatus includes a first displacement mechanism displacing a measurable object having an interior wall along a first plane; a measurement sensor measuring a surface texture of the interior wall without contact; a second displacement mechanism displacing the measurement sensor in an orthogonal direction orthogonal to the first plane and bringing the measurement sensor to face the interior wall; a third displacement mechanism displacing the measurement sensor facing the interior wall in a normal direction of the interior wall; and a fourth displacement mechanism displacing the measurement sensor facing the interior wall along the interior wall.

In addition, the measurement sensor may be an optical interference sensor measuring the surface texture using data on brightness of interference fringes formed by optical interference.

In addition, the measurement sensor may be an image sensor measuring the surface texture by capturing an image of the interior wall.

In addition, the measurement sensor may be a confocal sensor measuring the surface texture by focusing light on the interior wall.

In addition, the measurement sensor may be a sensor measuring the surface texture by detecting a peak in contrast of a captured image of the interior wall.

In addition, the surface texture measuring apparatus may be configured to further include a touch probe touching the measurable object in order to measure coordinates of the measurable object.

In addition, the touch probe may be configured to be capable of displacement between a measurement position, where the touch probe is positioned closer to the measurable object than the measurement sensor in the orthogonal direction, and a standby position, where the touch probe is further away from the measurable object than the measurement sensor in the orthogonal direction.

In addition, the surface texture measuring apparatus may further include a measurer to which the measurement sensor is mounted, the measurer having a length direction extending along the orthogonal direction. The measurer may include a collision detection sensor detecting a collision with the measurable object.

In addition, the surface texture measuring apparatus may further include a locking mechanism to lock drive of the first displacement mechanism and second displacement mechanism when measuring the surface texture of the interior wall while the third displacement mechanism displaces the measurement sensor.

The fourth displacement mechanism may be configured to include a drive source rotating the measurement sensor in a circumferential direction of the measurable object having a cylindrical interior wall as the interior wall, and the surface texture measuring apparatus may be configured to further include a rotation member having a first axis direction end coupled to the drive source, the rotation member supporting the measurement sensor and rotating in the circumferential direction; and a bearing supporting the rotation member during rotation at a second axis direction end of the rotation member.

In addition, the fourth displacement mechanism may be configured to rotate the measurement sensor in a circumferential direction of the measurable object having a cylindrical interior wall as the interior wall, and the surface texture measuring apparatus may be configured to further include a support member supporting a cable connected to the measurement sensor. The support member may be configured to rotate in the circumferential direction in conjunction with the circumferential direction rotation of the measurement sensor, in a state where the support member supports the cable.

According to the present invention, a detailed surface texture of an interior wall of a measurable object can be measured with a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Configuration of Surface Texture Measuring Apparatus

Figure 1:
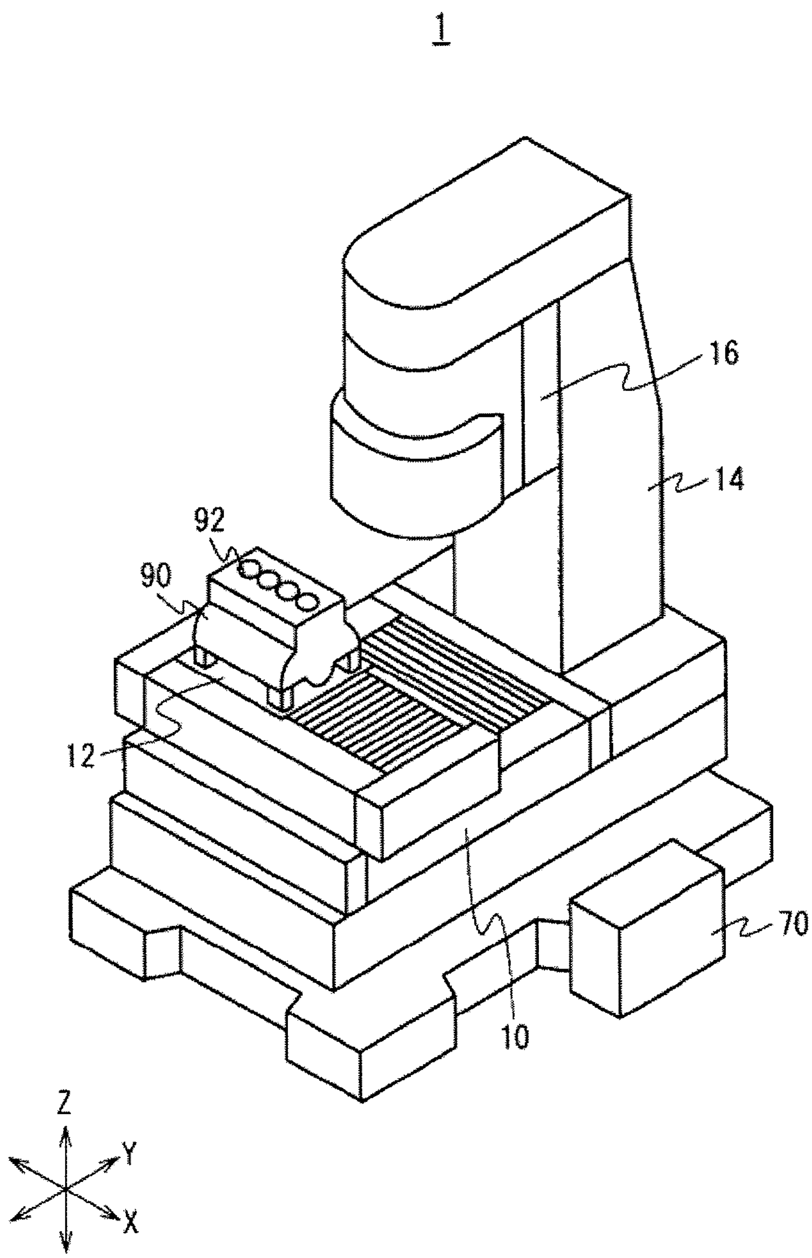
FIG. 1 is a perspective view illustrating an exemplary external configuration of a surface texture measuring apparatus according to an embodiment of the present invention.
Figure 2:
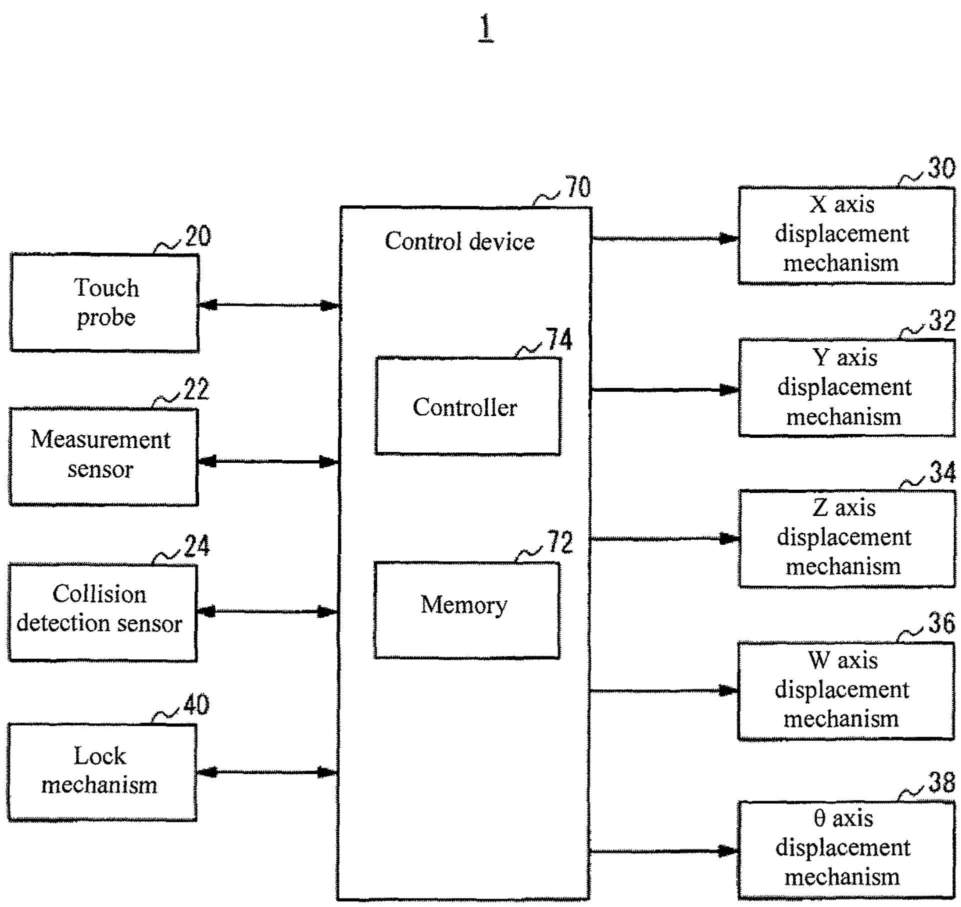
FIG. 2 is a block diagram illustrating a configuration of the surface texture measuring apparatus.

A configuration of a surface texture measuring apparatus 1 according to an embodiment of the present invention is described with reference to FIGS. 1 and 2. FIG. 1 is a perspective view illustrating an exemplary external configuration of the surface texture measuring apparatus 1 according to the present embodiment. FIG. 2 is a block diagram illustrating the configuration of the surface texture measuring apparatus 1.

As shown in FIGS. 1 and 2, the surface texture measuring apparatus 1 includes a table 10, a stage 12, a support column 14, a Z slider 16, a touch probe 20, a measurement sensor 22, a collision detection sensor 24, an X axis displacement mechanism/displacer 30, a Y axis displacement mechanism 32, a Z axis displacement mechanism/displacer 34, a W axis displacement mechanism/displacer 36, a θ axis displacement mechanism/displacer 38, a lock mechanism/lock 40, and a control device/controller 70. In the present embodiment, the X axis displacement mechanism 30 and Y axis displacement mechanism 32 correspond to a first displacement mechanism/displacer, the Z axis displacement mechanism 34 corresponds to a second displacement mechanism/displacer, the W axis displacement mechanism 36 corresponds to a third displacement mechanism/displacer, and the θ axis displacement mechanism 38 corresponds to a fourth displacement mechanism/displacer.

The surface texture measuring apparatus 1 is a device automatically measuring a surface texture of an interior wall 92 of a measurable object 90. In the following description, the measurable object 90 is a cylinder head of an engine. The cylinder head has four cylinders (cylinder portions), and the surface texture measuring apparatus 1 measures the surface texture of the interior walls 92 of the four cylinders. The surface texture measuring apparatus 1 is capable of measuring surface texture without disassembling or cutting the measurable object 90.

The table 10 is the base of the surface texture measuring apparatus 1. For example, the table 10 is arranged on an anti-vibration table installed on a shop floor. The anti-vibration table prevents vibrations in the shop floor from being transmitted to the table 10.

The stage 12 is provided on the table 10. The measurable object 90 is placed on the stage 12. The stage 12 is capable of displacement in X and Y axis directions using the X axis displacement mechanism 30 and the Y axis displacement mechanism 32. The measurable object 90 may also be placed on the stage 12 using a dedicated jig. In such a case, the surface texture of the interior wall 92 can be measured for measurable objects 90 having a large number of shapes.

The support column 14 is provided rising along a Z axis direction from a top surface of the table 10. The support column 14 supports the Z slider 16 such that the Z slider 16 is capable of displacement in the Z axis direction.

Figure 3:
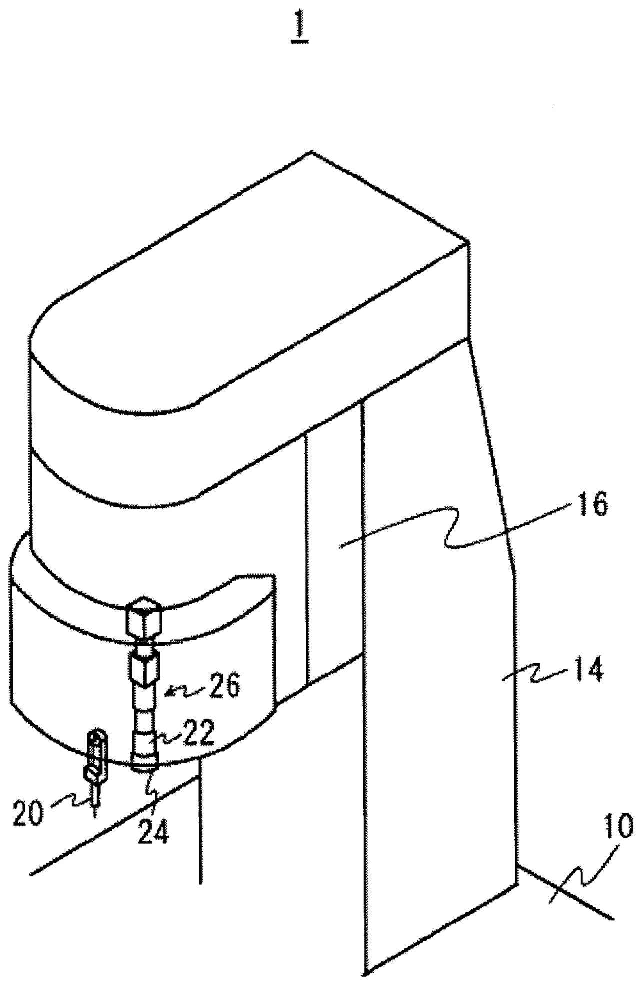
FIG. 3 is an explanatory diagram of a touch probe and a measurement sensor.

The Z slider 16 is capable of displacement in the Z axis direction, relative to the support column 14, using the Z axis displacement mechanism 34. As shown in FIG. 3, the touch probe 20, measurement sensor 22, and collision detection sensor 24 are mounted to the Z slider 16. Details of the Z slider 16 are described hereafter.

Figure 4:
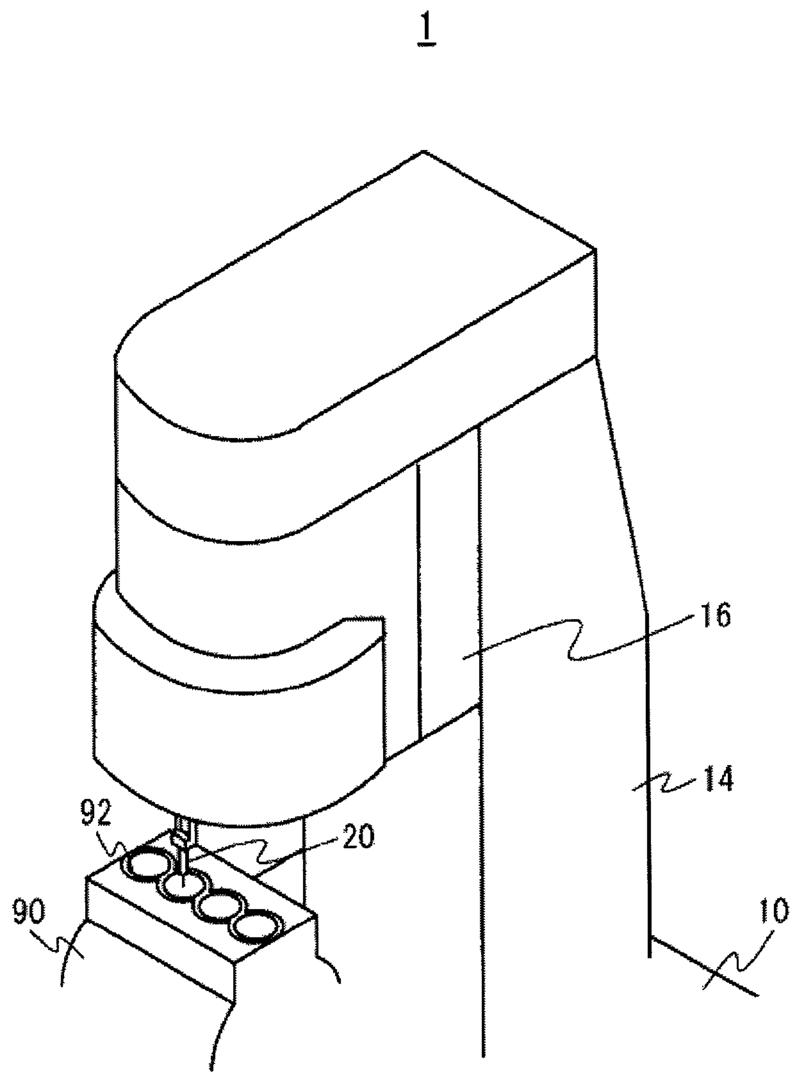
FIG. 4 illustrates a state where the touch probe is touching a measurable object.

FIG. 3 is an explanatory diagram of the touch probe 20 and the measurement sensor 22. FIG. 4 illustrates a state where the touch probe 20 is touching the measurable object 90. The touch probe 20 touches the measurable object 90 in order to measure coordinates of the measurable object 90. Because the touch probe 20 is mounted to the Z slider 16, the touch probe 20 displaces in the Z axis direction in conjunction with the displacement of the Z slider 16 in the Z axis direction. The Z slider 16 includes a displacement mechanism displacing the touch probe 20 upward and downward between a measurement position and a standby position in the Z axis direction.

In the measurement position of the touch probe 20, the touch probe 20 is positioned closer to the measurable object 90 than the measurement sensor 22 in the Z axis direction, in a position where the touch probe 20 can touch the measurable object 90. In the standby position of the touch probe 20, the touch probe 20 is in a position where the touch probe 20 is further from the measurable object 90 than the measurement sensor 22 in the Z axis direction. Normally, the touch probe 20 is in standby in the standby position and displaces to the measurement position when measuring the coordinates of the measurable object 90. Accordingly, while positioned in the stanby position, the touch probe 20 can be prevented from colliding with the measurable object 90 when the measurement sensor 22 measures the surface texture.

The measurement sensor 22 is a sensor measuring the surface texture of the interior wall 92 without contact. The measurement sensor 22 displaces in the Z axis direction in conjunction with the displacement of the Z slider 16 in the Z axis direction. The measurement sensor 22 measures a three-dimensional shape of the interior wall 92, for example, as the surface texture. Accordingly, unevenness of the interior wall 92 can be measured, and a volume of an indentation or a distribution of indentations can be measured, for example. As shown in FIG. 3, the measurement sensor 22 is mounted to a measurer 26 which extends downward from the Z slider 16 in the Z axis direction.

In the present embodiment, the measurement sensor 22 is an optical interference sensor measuring the surface texture of the interior wall 92 using data on brightness of interference fringes formed by optical interference. For example, it is known that in an optical interference sensor using a white light source, composite interference fringes formed by overlapping peaks of the interference fringes of various wavelengths increase in brightness at a focus position where an optical path length of a reference optical path matches the optical path length of a measurement optical path. Therefore, in the optical interference sensor, an interference image showing a two-dimensional distribution of interference fringes intensity is captured by an image capture element such as a CCD camera while changing the length of the measurement optical path, and the focus position where the intensity of interference light peaks is detected at various measurement positions in an image capture visual field. Accordingly, a height of a measured surface (specifically, the interior wall 92) at each measurement position is measured, and as a result a three-dimensional shape of the interior wall 92, for example, can be measured.

The optical interference sensor may for example use Michelson interferometry, which is well-known, and include a light source, lens, reference mirror, image capture element, and the like. In addition, in the present embodiment, light emitted from the light source positioned above the measurer 26 advances downward within the measurer 26, after which the optical axis of the light is bent 90° and the light is directed toward the interior wall 92 through an opening in a side surface of the measurer 26 facing the interior wall 92.

Referring back to FIG. 2, the collision detection sensor 24 detects a collision of the measurer 26 with the measurable object 90. The collision detection sensor 24 is provided to a tip of the measurer 26 below the Z slider 16. The collision detection sensor 24 projects in a radial direction of the cylindrical measurer 26 and is capable of touching the interior wall 92 before the measurement sensor 22 does. By detecting a collision using the collision detection sensor 24, it is possible to prevent the measurement sensor 22 from touching the interior wall 92, for example.

The X axis displacement mechanism 30 is a drive mechanism displacing the stage 12, on which the measurable object 90 rests, in the X axis direction (FIG. 1). The X axis displacement mechanism 30 is configured by a feed screw mechanism, for example, although those of skill in the art would understand that (like all disclosed displacement mechanisms/displacers) other suitable displacers may be used in alternative embodiments. The feed screw mechanism is a ball screw mechanism which includes a ball screw shaft and a nut member threading onto the ball screw shaft. The X axis displacement mechanism 30 is not limited to a ball screw mechanism and may also be configured by a belt mechanism, for example, although those of skill in the art would understand that other suitable displacers may be used in alternative embodiments.

The Y axis displacement mechanism 32 is a drive mechanism displacing the stage 12 in the Y axis direction (FIG. 1). The Y axis displacement mechanism 32 is configured by a feed screw mechanism, for example, similar to the X axis displacement mechanism 30, although those of skill in the art would understand that other suitable displacers may be used in alternative embodiments. In the present embodiment, the X axis displacement mechanism 30 and the Y axis displacement mechanism 32 work together to displace the stage 12, on which the measurable object 90 rests, along an XY plane (first plane) where the X axis direction and Y axis direction are mutually orthogonal.

The Z axis displacement mechanism 34 is a drive mechanism displacing the Z slider 16 (measurer 26) in the Z axis direction (FIG. 1), which is orthogonal to the XY plane. The Z axis displacement mechanism 34 is configured by a feed screw mechanism, for example. The Z axis displacement mechanism 34 brings the measurement sensor 22 to face the interior wall 92 by lowering the measurer 26 in the Z axis direction.

Figure 5A:
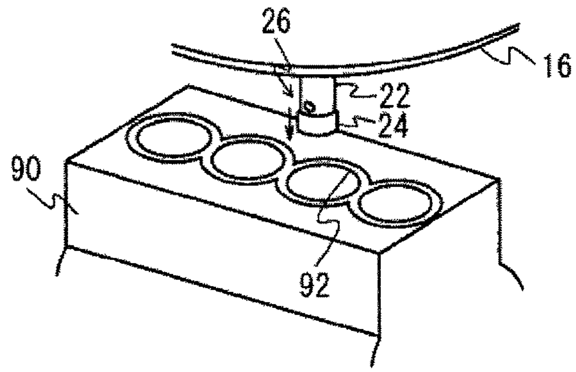
FIGS. 5A to 5C are explanatory diagrams illustrating displacement directions of a measurer.
Figure 5B:
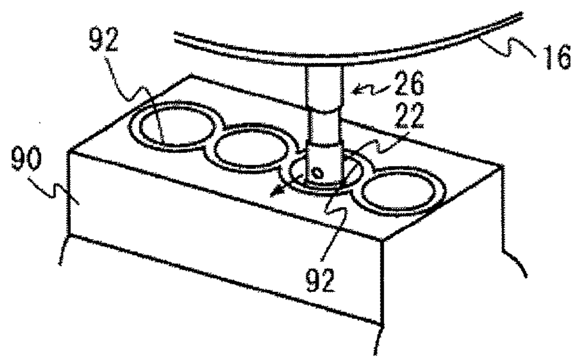
Figure 5C:
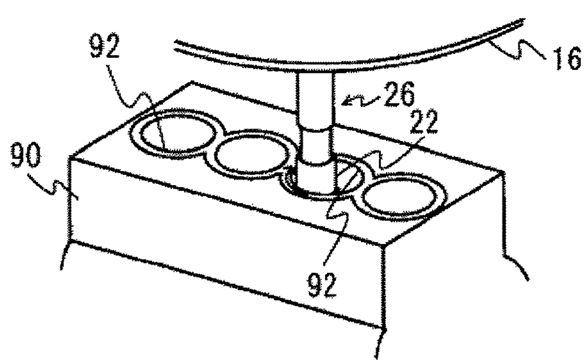

FIGS. 5A to 5C are explanatory diagrams illustrating displacement directions of the measurer 26. By lowering the measurer 26 in the direction of an arrow shown in FIG. 5A (specifically, by placing the measurement sensor 22 inside the cylinder portion), the Z axis displacement mechanism 34 brings the measurement sensor 22 to face the interior wall 92, as shown in FIG. 5B. In the present embodiment, only the measurer 26 is positioned inside the cylinder portion. Therefore, even when the cylinder portion of the measurable object 90 has a small diameter, the surface texture of the interior wall 92 of the cylinder portion can be measured.

The W axis displacement mechanism 36 is a drive mechanism displacing the measurer 26 which faces the interior wall 92 (specifically, the measurement sensor 22) in the normal direction of the interior wall 92. In this example, the normal direction of the interior wall 92 is the same direction as the radial direction (hereafter called a W axis direction) of the cylinder portion of the measurable object 90. Therefore, the W axis displacement mechanism 36 displaces the measurement sensor 22 in the W axis direction. The W axis displacement mechanism 36 displaces the measurement sensor 22 from the center of the cylinder portion of the measurable object 90 toward the interior wall 92 (direction of an arrow shown in FIG. 5B), for example. Accordingly, the measurement sensor 22 approaches the interior wall 92 closely, as shown in FIG. 5C.

When the W axis displacement mechanism 36 displaces the measurement sensor 22 in the W axis direction, the measurement sensor 22 performs a scan in a predetermined scanning range (measurement range) in the W axis direction and measures the surface texture of the interior wall 92.

The θ axis displacement mechanism 38 is a drive mechanism displacing the measurer 26 which faces the interior wall 92 (specifically, the measurement sensor 22) along the interior wall 92. Specifically, the θ axis displacement mechanism 38 rotates the measurement sensor 22 in a θ axis direction (direction of an arrow shown in FIG. 5C), which is the circumferential direction of the cylinder portion of the measurable object 90 having a cylindrical interior wall (interior wall 92).

In the present embodiment, the interior wall 92 is divided into a plurality of measurement regions in the circumferential direction, and the measurement sensor 22 measures the surface texture of each measurement region. Accordingly, by displacing in the θ axis direction (circumferential direction) using the θ axis displacement mechanism 38, the measurement sensor 22 can measure the surface texture of each measurement region.

Figure 6:
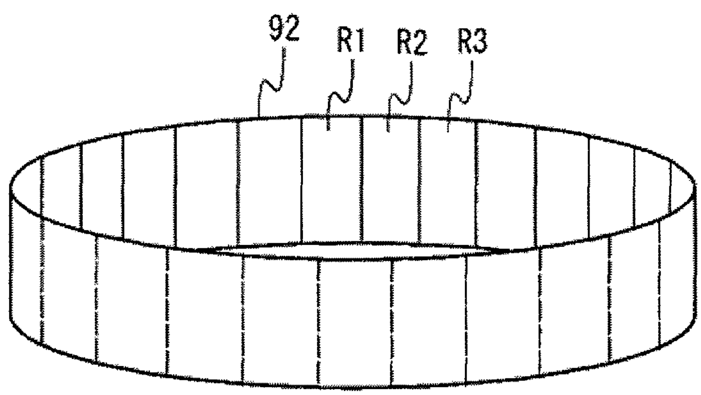
FIG. 6 is an explanatory diagram of a plurality of measurement regions lying along a circumferential direction of an interior wall surface.

FIG. 6 is an explanatory diagram of a plurality of measurement regions lying along the circumferential direction of the interior wall 92. The measurement regions (measurement regions R1, R2, R3, and the like shown in FIG. 6) are rectangular sections of the interior wall 92. A size of the measurement region may be defined in accordance with a size of a field of view that the image capture element of the measurement sensor 22 is capable of capturing, for example.

Figure 7A:
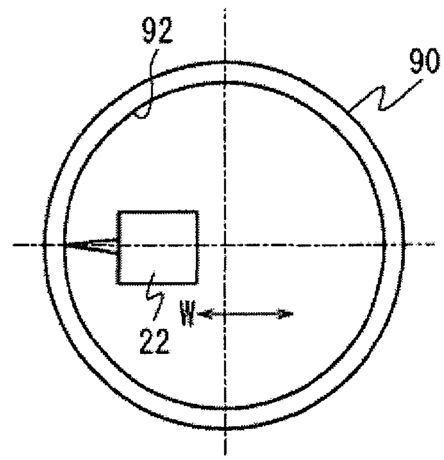
FIGS. 7A and 7B are schematic diagrams illustrating a position of the measurement sensor in a θ axis direction.
Figure 7B:
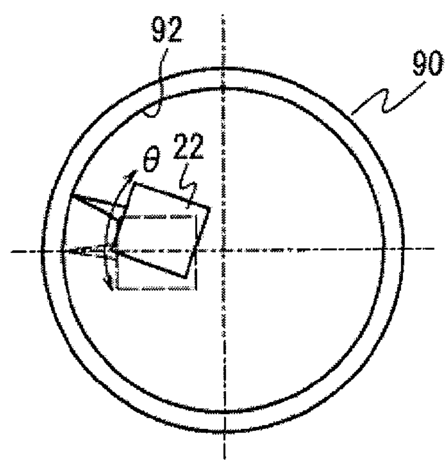

FIGS. 7A and 7B are schematic diagrams illustrating a position of the measurement sensor 22 in the θ axis direction. FIG. 7A illustrates the position of the measurement sensor 22 when measuring the surface texture of the measurement region R1 shown in FIG. 6. FIG. 7B illustrates the position of the measurement sensor 22 when measuring the surface texture of the measurement region R2, which is adjacent to the measurement region R1. The measurement sensor 22 measures the surface texture of the measurement region R1 by scanning the measurement region R1 while displacing in the W axis direction, after which the measurement sensor 22 displaces in the θ axis direction (circumferential direction of the interior wall 92). The measurement sensor 22 then measures the surface texture of the measurement region R2 by scanning the measurement region R2 while displacing in the W axis direction.

Returning to FIG. 2, the lock mechanism 40 locks drive to the X axis displacement mechanism 30, the Y axis displacement mechanism 32, and the Z axis displacement mechanism 34 when the measurement sensor 22 measures the surface texture of the interior wall 92 while displacing in the W axis direction. Specifically, the lock mechanism 40 switches off drive motors respectively provided to each of the X axis displacement mechanism 30, the Y axis displacement mechanism 32, and the Z axis displacement mechanism 34. In addition, the lock mechanism 40 includes a brake mechanism such as a disk brake, details of which are described hereafter. In such a case, when the measurement sensor 22 performs a scan, vibration due to the motors of the X axis displacement mechanism 30, the Y axis displacement mechanism 32, and the Z axis displacement mechanism 34 can be inhibited, and therefore a decrease in accuracy of a surface texture measurement caused by vibration can be inhibited. Moreover, in addition to the X axis displacement mechanism 30, the Y axis displacement mechanism 32, and the Z axis displacement mechanism 34, the lock mechanism 40 may also lock the drive of the θ axis displacement mechanism 38.

The control device 70 controls overall operations of the surface texture measuring apparatus 1. The control device 70 includes a memory 72 and a controller 74. The memory 72 includes, for example, a ROM (Read Only Memory) and RAM (Random Access Memory). The memory 72 stores programs executed by the controller 74 and various kinds of data. For example, the memory 72 stores measurement results of the interior wall 92 obtained by the measurement sensor 22 and analysis results of the surface texture of the interior wall 92 based on the measurement results.

The controller 74 is a CPU (Central Processing Unit), for example. The controller 74 controls operations of the surface texture measuring apparatus 1 by executing a program stored in the memory 72. For example, the controller 74 drives the X axis displacement mechanism 30, the Y axis displacement mechanism 32, the Z axis displacement mechanism 34, the W axis displacement mechanism 36, and the θ axis displacement mechanism 38, thereby enabling automatic measurement of the interior walls 92 of the four cylinders of the cylinder head (measurable object 90). In addition, the controller 74 analyzes the surface texture of the interior wall 92 based on the measurement results.

Detailed Configuration of Z Slider

Figure 8:
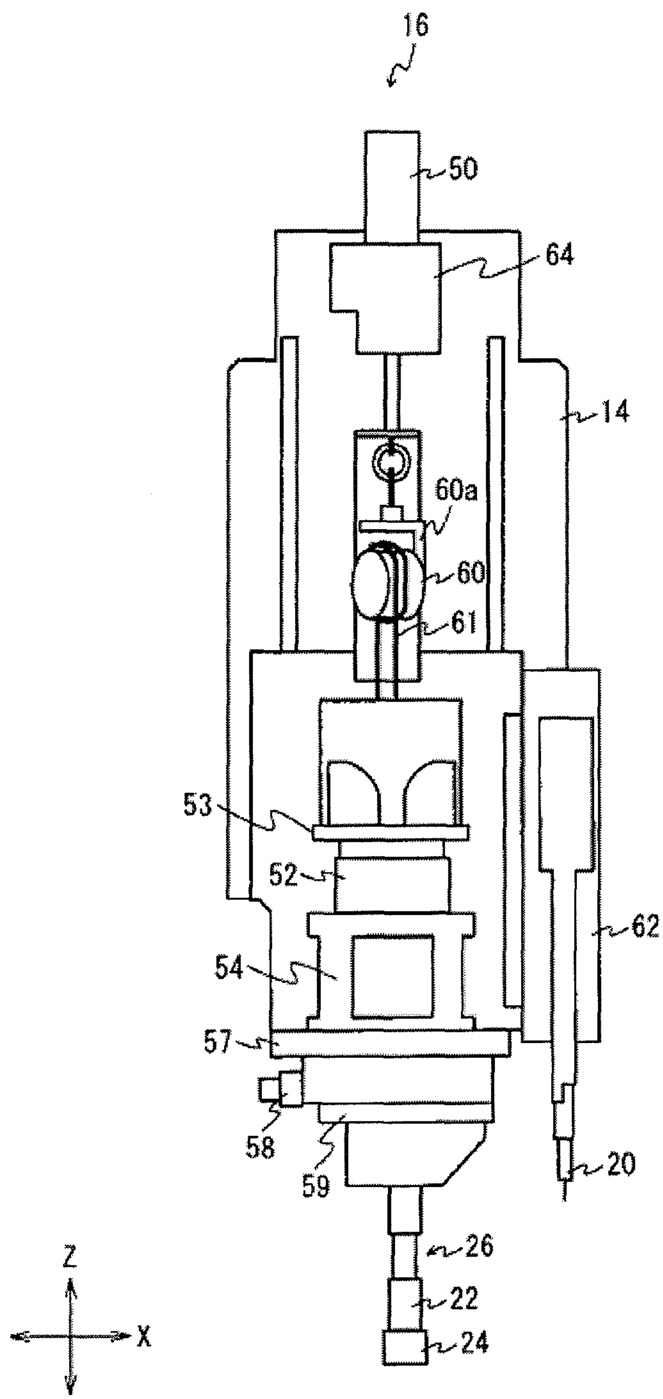
FIG. 8 illustrates a configuration of a Z slider.
Figure 9:
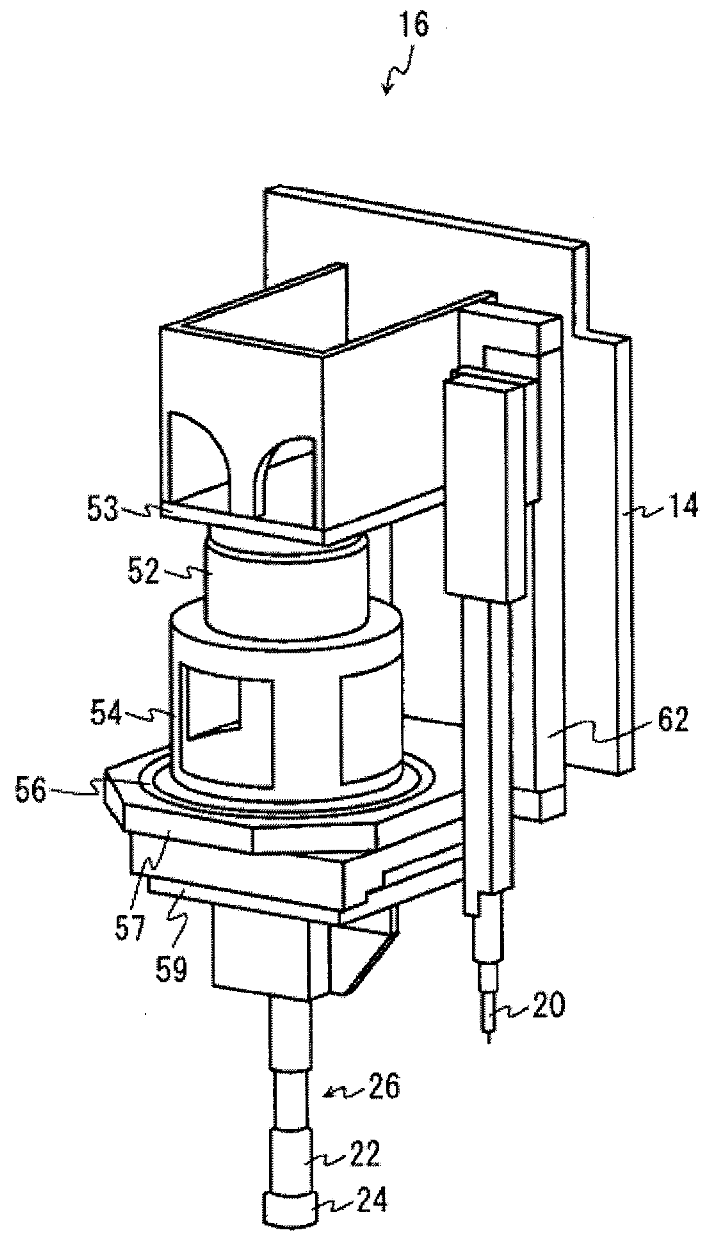
FIG. 9 is a perspective view of a portion of the Z slider shown in FIG. 8.

A detailed configuration of the Z slider 16 is described with reference to FIGS. 8 and 9. FIG. 8 illustrates an exemplary configuration of the Z slider 16. FIG. 9 is a perspective view of a portion of the Z slider 16 shown in FIG. 8. Moreover, for ease of description, a cover covering the Z slider 16 is not depicted in FIGS. 8 and 9.

As shown in FIGS. 8 and 9, the Z slider 16 includes a Z axis drive motor 50, a θ axis drive motor 52, a rotation member/rotator 54, a support bearing 56, a W axis drive motor 58, a support pulley 60, a probe support 62, and a brake mechanism/brake 64.

The Z axis drive motor 50 is provided to an upper portion of the Z slider 16 and is a drive source displacing the entire Z slider 16 in the Z axis direction, the Z slider 16 being supported on the support column 14. By displacing the Z slider 16 in the Z axis direction using the Z axis drive motor 50, the measurer 26 and the touch probe 20 are also displaced in the Z axis direction.

The θ axis drive motor 52 is a drive source rotating the rotation member 54 and the measurer 26 in the θ axis direction. A fixation member 53 is provided below the Z axis drive motor 50 and the θ axis drive motor 52 is fixated to the fixation member 53. The support column 14 provides cantilever support for the fixation member 53. By rotating the measurer 26 in the θ axis direction using the θ axis drive motor 52, the measurement sensor 22 is also rotated in the θ axis direction.

The rotation member 54 is coupled to the θ axis drive motor 52 and is rotated in the θ axis direction by the θ axis drive motor 52. The rotation member 54 is cylindrical. A first axis direction end of the rotation member 54 is coupled to the θ axis drive motor 50, and a second axis direction end of the rotation member 54 supports the measurer 26. Therefore, the rotation member 54 and the measurer 26 rotate together.

The support bearing 56 is provided to the second axis direction end of the rotation member 54, and the rotation member 54 is supported by the θ axis drive motor 52 during rotation. The support bearing 56 is, for example, a metallic bearing and is provided to an adapter plate 57, which is supported by the support column 14. By providing the support bearing 56, rotational deflection of the rotation member 54 can be inhibited, and therefore a decrease in measurement accuracy of the measurer 26, which rotates together with the rotation member 54, can be inhibited. In addition, the support bearing 56 absorbs vibration, and therefore vibration during rotation of the rotation member 54 can be inhibited. Moreover, the support column 14 provides cantilever support to the fixation member 53, to which the θ axis drive motor 52 is fixated, and therefore the fixation member 53 may warp. However, by providing the support bearing 56 and supporting the rotation member 54, warping can be inhibited.

The W axis drive motor 58 is a drive source displacing the measurer 26 in the W axis direction. By displacing a support plate 59 supporting the measurer 26 in the W axis direction, the W axis drive motor 58 displaces the measurer 26 in the W axis direction. Moreover, the W axis drive motor 58 and the support plate 59 are configured so as to rotate together with the rotation member 54.

The support pulley 60 supports a cable 61, which is connected to the measurement sensor 22, for example. The support pulley 60 is axially supported by a support mechanism **60*a* provided above the θ axis drive motor 52. The support mechanism 60*a* is provided within the support column 14 so as to freely rotate centered on an axis parallel to the Z axis direction. With this configuration, the support pulley 60 is capable of rotating centered on an axis parallel to the Z axis direction via the support mechanism 60*a*. In other words, the support pulley 60 rotates in a circumferential direction in a state supporting the cable 61, in conjunction with rotation of the measurement sensor 22 in the θ axis direction. Specifically, the support pulley 60 supporting the cable 61 rotates in the same direction as the measurement sensor 22. In such a case, twisting of the cable 61 when the measurement sensor 22** rotates in the θ axis direction can be inhibited.

The probe support 62 is provided along the θ axis drive motor 52, the rotation member 54, and the W axis drive motor 58 (specifically, along the Z axis direction) and supports the touch probe 20 such that the touch probe 20 is capable of displacement in the Z axis direction. Specifically, the probe support 62 includes a driver and supports the touch probe 20 such that the touch probe 20 is capable of vertical displacement between the standby position (position shown in FIG. 8) and the measurement position.

The brake mechanism 64 is provided between the Z axis drive motor 50 and the support pulley 60 in the Z axis direction. The brake mechanism 64 is a disk brake mechanism in this example, and locks the Z axis drive motor 50. The brake mechanism 64 locks the Z axis drive motor 50 when the lock mechanism 40 described above (see FIG. 2) has set the Z axis drive motor 50 to OFF.

Figure 10:
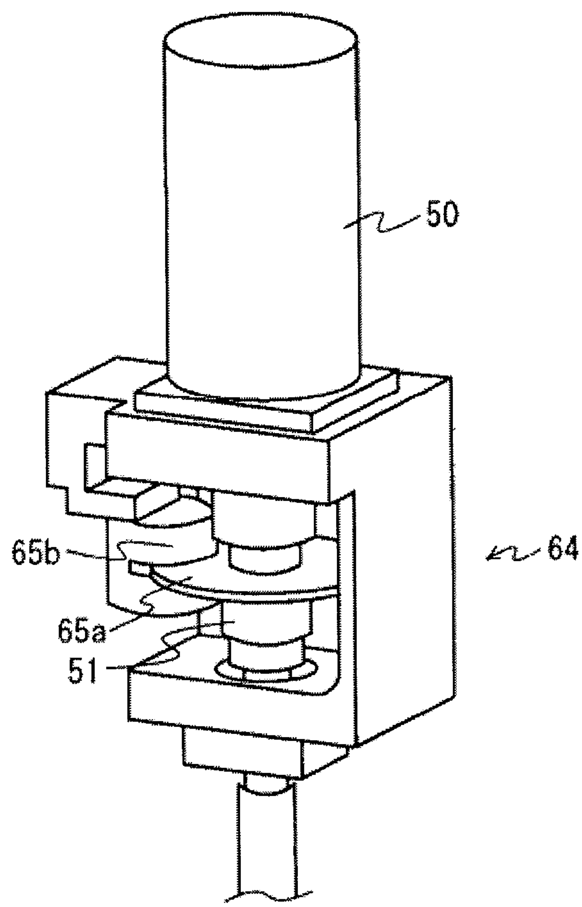
FIG. 10 is an explanatory diagram of an exemplary configuration of a brake mechanism.

FIG. 10 is an explanatory diagram of an exemplary configuration of the brake mechanism 64. The brake mechanism 64 includes a disk portion 65*a* and a brake portion 65*b*. The disk portion 65*a* is mounted to a motor shaft 51 of the Z axis drive motor 50. The brake portion 65*b* is configured to be capable of gripping the disk portion 65*a* vertically. When the brake portion 65*b* grips the disk portion 65*a*, the brake portion 65*b* locks motor shaft 51.

In the above description, the brake mechanism 64 locks the motor shaft 51 when the Z axis drive motor 50 is set to OFF. However, the present invention is not limited to this. For example, a configuration is also possible in which the brake mechanism 64 locks the motor shaft 51 when the Z axis drive motor 50 is set to ON. In such a case, vibration due to the Z axis drive motor 50 can be inhibited.

Method of Measuring Surface Texture of Interior Wall

A description is now given of a method of measuring the surface texture of the interior wall 92 using the surface texture measuring apparatus 1 described above. Measurement of the surface texture of the interior wall 92 is performed by the controller 74 of the control device 70 executing a program stored in the memory 72.

In this example, as shown in FIG. 1, the measurable object 90 is placed on the stage 12. First, the controller 74 drives the X axis displacement mechanism 30 and the Y axis displacement mechanism 32 and displaces the stage 12 in the X axis direction and the Y axis direction to position the measurable object 90 below the Z slider 16 (see FIG. 4).

Next, the controller 74 displaces the touch probe 20 from the standby position to the measurement position to touch the measurable object 90 (cylinder block) and thereby measures, for example, a top surface height of the cylinder block, a center position and diameter of the cylinder, and the like. When measurement ends, the controller 74 displaces the touch probe 20 to the standby position.

Next, the controller 74 drives the X axis displacement mechanism 30 and the Y axis displacement mechanism 32 and, based on the measurement results of the touch probe 20, displaces the measurer 26 to the center of the cylinder (FIG. 5A). Next, the controller 74 drives the Z axis displacement mechanism 34 and lowers the measurer 26 into the cylinder (FIG. 5B).

Next, the controller 74 drives the W axis displacement mechanism 36 and displaces the measurer 26 in the W axis direction (FIG. 5C). When the measurer 26 displaces in the W axis direction, the measurement sensor 22 of the measurer 26 scans a first measurement region of the interior wall 92 of the measurable object 90. When the scan of the first measurement region ends, the controller 74 drives the θ axis displacement mechanism 38 and rotates the measurer 26 in the θ axis direction. Then the controller 74 displaces the measurer 26 in the W axis direction and scans the measurement region adjacent to the first measurement region on the interior wall 92. In this way, the entire interior wall 92 is scanned by repeating the W axis direction and θ axis direction displacement of the measurer 26.

Next, the controller 74 analyzes the surface texture of the interior wall 92 based on the measurement results of each measurement region of the interior wall 92. The controller 74 analyzes a detailed three-dimensional shape of the interior wall 92, for example, as the surface texture.

Benefits of the Present Embodiment

In addition to the X axis displacement mechanism 30, the Y axis displacement mechanism 32, and the Z axis displacement mechanism 34, the surface texture measuring apparatus 1 according to the above-described embodiment includes the W axis displacement mechanism 36 displacing the measurement sensor 22 in the W axis direction (normal direction of the interior wall 92) in a state where the measurement sensor 22 faces the interior wall 92, and the θ axis displacement mechanism 38 displacing the measurement sensor 22 in the θ axis direction (circumferential direction of the cylinder portion), the measurement sensor 22 measuring the surface texture of the interior wall 92 of the measurable object 90 without contact. In such a case, after the measurement sensor 22 is brought to face the interior wall 92 by the X axis displacement mechanism 30, the Y axis displacement mechanism 32, and the Z axis displacement mechanism 34, the measurement sensor 22 is displaced in the W axis direction and θ axis direction by the W axis displacement mechanism 36 and the θ axis displacement mechanism 38. Accordingly, a detailed surface texture of the interior wall 92 of the measurable object 90 can be automatically measured with a high degree of accuracy.

In the above description, the measurement sensor 22 is an optical interference sensor measuring the surface texture of the interior wall 92 using optical interference measurement. However, the present invention is not limited to this. For example, the measurement sensor 22 may be an image sensor measuring the surface texture of the interior wall 92 by capturing an image of the interior wall 92. In such a case, a detailed surface texture of the interior wall 92 can be measured with a high degree of accuracy by an image sensor having a simple configuration.

In addition, the measurement sensor 22 may be a confocal sensor measuring the surface texture of the interior wall 92 by focusing light on the interior wall 92. Moreover, the measurement sensor 22 may be a sensor (referred to as a contrast sensor for ease of description) measuring the surface texture of the interior wall 92 by detecting a peak in contrast of a captured image of the interior wall 92. A detailed three-dimensional shape of the interior wall 92 can be measured with a high degree of accuracy by using the confocal sensor or contrast sensor as the measurement sensor 22 in this way.

In the above, the measurable object 90 is a cylinder head of an engine. However, the measurable object 90 is not limited to this. The measurable object 90 may instead be a honing pipe, for example. In other words, the measurable object 90 may be any object having a cylinder portion.

In addition, in the above description, the surface texture of the interior wall 92 of the cylinder portion is measured. However, the present invention is not limited to this. For example, the measurable object 90 may instead have a squared tube portion (a rectangular shape when viewed from above) and a surface texture of the interior wall 92 of the squared tube portion may be measured instead.

The present invention is described above by way of an embodiment, but the technical scope of the present invention is not limited to that described in the embodiment above. It is clear to one skilled in the art that many modifications or improvements might be added to the embodiment above. The scope of the claims makes clear that the addition of such modifications and improvements is also included in the technical scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface texture measuring apparatus comprising:
- a first displacer configured to displace a measurable object having an interior wall along a first plane;
- a measurement sensor configured to measure a surface texture of the interior wall without contact;
- a second displacer configured to displace the measurement sensor in an orthogonal direction orthogonal to the first plane, and to displace the measurement sensor to face the interior wall;
- a third displacer configured to displace the measurement sensor facing the interior wall in a normal direction of the interior wall; and
- a fourth displacer configured to displace the measurement sensor facing the interior wall along the interior wall.

2. The surface texture measuring apparatus according to claim 1, wherein the measurement sensor is an optical interference sensor configured to measure the surface texture using data on brightness of interference fringes formed by optical interference.

3. The surface texture measuring apparatus according to claim 1, wherein the measurement sensor is an image sensor configured to measure the surface texture by capturing an image of the interior wall.

4. The surface texture measuring apparatus according to claim 1, wherein the measurement sensor is a confocal sensor configured to measure the surface texture by focusing light on the interior wall.

5. The surface texture measuring apparatus according to claim 1, wherein the measurement sensor is a sensor configured to measure the surface texture by detecting a peak in contrast of a captured image of the interior wall.

6. The surface texture measuring apparatus according to claim 1, further comprising a touch probe configured to contact the measurable object in order to measure coordinates of the measurable object.

7. The surface texture measuring apparatus according to claim 6, wherein the touch probe is displaceable between a measurement position, where the touch probe is positioned closer to the measurable object than the measurement sensor in the orthogonal direction, and a standby position, where the touch probe is further away from the measurable object than the measurement sensor in the orthogonal direction.

8. The surface texture measuring apparatus according to claim 1, further comprising a measurer to which the measurement sensor is mounted, the measurer having a length direction extending along the orthogonal direction, wherein the measurer includes a collision detection sensor configured to detect a collision with the measurable object.

9. The surface texture measuring apparatus according to claim 1, further comprising a lock configured to lock driving of the first displacer and second displacer when measuring the surface texture of the interior wall, while the third displacer displaces the measurement sensor.

10. The surface texture measuring apparatus according to claim 1, wherein:
- the fourth displacer includes a drive source configured to rotate the measurement sensor in a circumferential direction of the measurable object having a cylindrical interior wall as the interior wall, and
- the surface texture measuring apparatus further comprises:
  - a rotator having a first axis direction end coupled to the drive source, the rotation member configured to support the measurement sensor and rotate in the circumferential direction; and
  - a bearing configured to support the rotator during rotation at a second axis direction end of the rotation member.

11. The surface texture measuring apparatus according to claim 1, wherein:
- the fourth displacer is further configured to rotate the measurement sensor in a circumferential direction of the measurable object having a cylindrical interior wall as the interior wall, and
- the surface texture measuring apparatus further comprises a support configured to support a cable connected to the measurement sensor,
- the support is further configured to rotate in the circumferential direction in conjunction with the circumferential direction rotation of the measurement sensor, in a state where the support member supports the cable.

* * * * *